(12) United States Patent
Boggs et al.

(10) Patent No.: US 11,018,511 B2
(45) Date of Patent: May 25, 2021

(54) SYSTEM AND METHOD FOR BALANCING BATTERY CELL CHARGE IN BATTERY ARRAY FOR ELECTRIFIED MACHINE

(71) Applicant: Caterpillar Inc., Deerfield, IL (US)

(72) Inventors: Matthew Lee Boggs, Metamora, IL (US); Jason Lee Miller, Princeville, IL (US); Justin Dale Middleton, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 333 days.

(21) Appl. No.: 16/023,175

(22) Filed: Jun. 29, 2018

(65) Prior Publication Data

US 2020/0006956 A1 Jan. 2, 2020

(51) Int. Cl.
| | |
|---|---|
| *H02J 7/00* | (2006.01) |
| *H01M 10/44* | (2006.01) |
| *H01M 10/46* | (2006.01) |
| *B60L 58/21* | (2019.01) |

(52) U.S. Cl.
CPC ............ *H02J 7/0014* (2013.01); *B60L 58/21* (2019.02); *H01M 10/441* (2013.01); *H01M 10/46* (2013.01); *H02J 7/00* (2013.01); *H01M 2220/20* (2013.01)

(58) Field of Classification Search
CPC .............. H02J 7/0031; H02J 2007/004; H02J 2007/0037; H02J 7/0016; H02J 7/0014; H02J 7/00; Y02E 60/12; B60L 58/21; H01M 10/48; H01M 10/441; H01M 10/46; H01M 2220/20

USPC .................................................. 320/134, 136
See application file for complete search history.

(56) References Cited

U.S. PATENT DOCUMENTS

| | | | |
|---|---|---|---|
| 5,850,351 A | 12/1998 | Lofty et al. | |
| 7,638,979 B2 | 12/2009 | Vandensande | |
| 9,568,534 B2 | 2/2017 | Martin et al. | |
| 2011/0175577 A1* | 7/2011 | Kitanaka | H02J 7/0021 320/163 |
| 2012/0217813 A1 | 8/2012 | Takeuchi et al. | |
| 2013/0264881 A1* | 10/2013 | Roeper | H04L 7/02 307/77 |
| 2014/0062407 A1* | 3/2014 | Brisebois | H01M 10/482 320/116 |

(Continued)

*Primary Examiner* — Nathaniel R Pelton
*Assistant Examiner* — Mohammed J Sharief
(74) *Attorney, Agent, or Firm* — Oblon, McClelland, Maier & Neustadt, L.L.P.

(57) ABSTRACT

A system for balancing battery cell charge in a battery array for an electrified machine is provided. The battery array includes a plurality of individual battery cells, or groups of battery cells. A plurality of cell monitors are in communication with the individual battery cells, or groups of battery cells, with the plurality of cell monitors being powered by the individual battery cells, or groups of battery cells. A battery controller of the system receives information about the individual battery cells, or groups of battery cells, from the plurality of cell monitors. The information traverses the plurality of cell monitors in a first pattern to the battery controller and, after a predetermined period of time or occurrence of a predetermined event, the information traverses the plurality of cell monitors in a second pattern that is different than the first pattern to the battery controller.

20 Claims, 5 Drawing Sheets

(56) References Cited

U.S. PATENT DOCUMENTS

| | | | |
|---|---|---|---|
| 2014/0111160 A1* | 4/2014 | Nozawa | G01R 31/3835 |
| | | | 320/118 |
| 2015/0102943 A1 | 4/2015 | de Greef et al. | |
| 2016/0190832 A1* | 6/2016 | Sugimura | G01R 31/396 |
| | | | 320/116 |
| 2017/0177048 A1 | 6/2017 | Dimen | |
| 2019/0173133 A1* | 6/2019 | Shen | H02J 7/0031 |
| 2019/0187221 A1* | 6/2019 | Mukuno | H03K 5/24 |
| 2020/0076013 A1* | 3/2020 | Sato | H01M 10/425 |

\* cited by examiner

SYSTEM AND METHOD FOR BALANCING BATTERY CELL CHARGE IN BATTERY ARRAY FOR ELECTRIFIED MACHINE

TECHNICAL FIELD

The present disclosure relates generally to a battery array for an electrified machine, and more particularly to a system and method for balancing battery cell charge in the battery array.

BACKGROUND

Large battery array deployments, like those used in electrified vehicles or machines, require monitoring of individual battery cells of the battery array to increase safety and performance. These cell monitors consume energy from the battery cells, thus reducing the energy available for primary machine functions. Also, the nature of operation and inter-module communications architecture of the cell monitors can cause charge imbalance in large battery arrays. Charge imbalance can result in increased machine downtime while the battery array is balanced and recharged.

U.S. Pat. No. 7,638,979 to Vandensande discloses a method and system for monitoring battery stacks comprising a controller for calculating a correction factor used to correct battery voltage measurements. The monitoring system monitors voltage of a stack of batteries. Each battery has a plurality of cells. A monitoring unit is associated with each battery and measures voltage across a selected cell. A first monitoring unit and a second monitoring unit measure the same cell. The first and second measurements are used to calculate a correction factor which can be used to correct a set of measurements made by one of the monitoring units. The monitoring units are arranged in a chain, with adjacent units in the chain being connected by a communication interface in which data is transmitted as signaling voltage levels between interface units. The interface unit of a pair of monitoring units use the same signaling voltage levels.

SUMMARY OF THE INVENTION

In one aspect, a system for balancing battery cell charge in a battery array for an electrified machine is provided. The battery array includes a plurality of individual battery cells, or groups of battery cells. A plurality of cell monitors are in communication with the individual battery cells, or groups of battery cells, with the plurality of cell monitors being powered by the individual battery cells, or groups of battery cells. A battery controller of the system receives information about the individual battery cells, or groups of battery cells, from the plurality of cell monitors. The information traverses the plurality of cell monitors in a first pattern to the battery controller and, after a predetermined period of time or occurrence of a predetermined event, the information traverses the plurality of cell monitors in a second pattern that is different than the first pattern to the battery controller.

In another aspect, a method of balancing cell charge in a battery array for an electrified machine includes powering at least a portion of the electrified machine using the battery array, powering a plurality of cell monitors using individual battery cells, or groups of battery cells, of the battery array, and monitoring the individual battery cells, or groups of battery cells, using the plurality of cell monitors. Information about the individual battery cells, or groups of battery cells, is passed from the plurality of cell monitors to a battery controller, with the information traversing the plurality of cell monitors in a first pattern. Thereafter, information about the individual battery cells, or groups of battery cells, is passed from the plurality of cell monitors to the battery controller, with the information traversing the plurality of cell monitors in a second pattern that is different than the first pattern.

In another aspect, an electrified machine includes a machine frame, ground-engaging elements supported by the machine frame, and a battery array including a plurality of individual battery cells, or groups of battery cells, supported by the machine frame for powering the ground-engaging elements. The electrified machine also includes a plurality of cell monitors in communication with the individual battery cells, or groups of battery cells, with the plurality of cell monitors being powered by the individual battery cells, or groups of battery cells. A battery controller receives information about the individual battery cells, or groups of battery cells, from the plurality of cell monitors, with the information traversing the plurality of cell monitors in a first pattern to the battery controller. After a predetermined period of time or occurrence of a predetermined event, the information traverses the plurality of cell monitors in a second pattern that is different than the first pattern to the battery controller.

DETAILED DESCRIPTION

Figure 1:
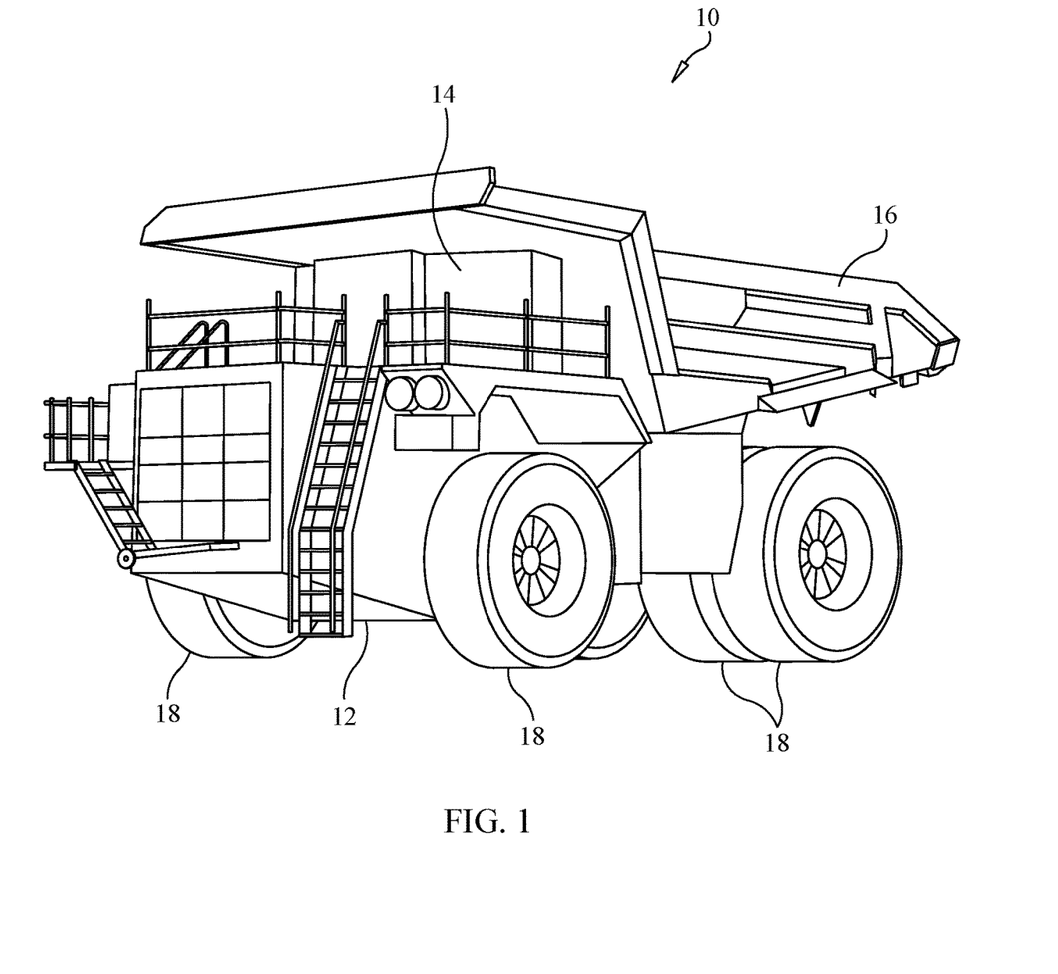
FIG. 1 is a perspective view of an exemplary electrified machine, according to the present disclosure.

An exemplary electrified machine 10 is shown in FIG. 1. The electrified machine 10 may be any machine or vehicle powered, at least partially, by batteries, as will be described below with reference to FIG. 2. The electrified machine 10 may be a mining truck, as depicted, or any other on-highway or off-highway machine or vehicle. According to the exemplary embodiment, the electrified machine 10 may include a machine frame 12 supporting at least an operator control station 14 and a dump body 16. Ground-engaging elements 18, such as wheels and/or tires, may also be supported by the machine frame 12, and may be powered by a drive system, discussed below, supported by the machine frame 12.

Although a specific embodiment, or implementation, is shown, it should be appreciated that the present disclosure is applicable to a wide variety of large battery array deployments, which may include use in a variety of different machines and/or vehicles.

Figure 2:
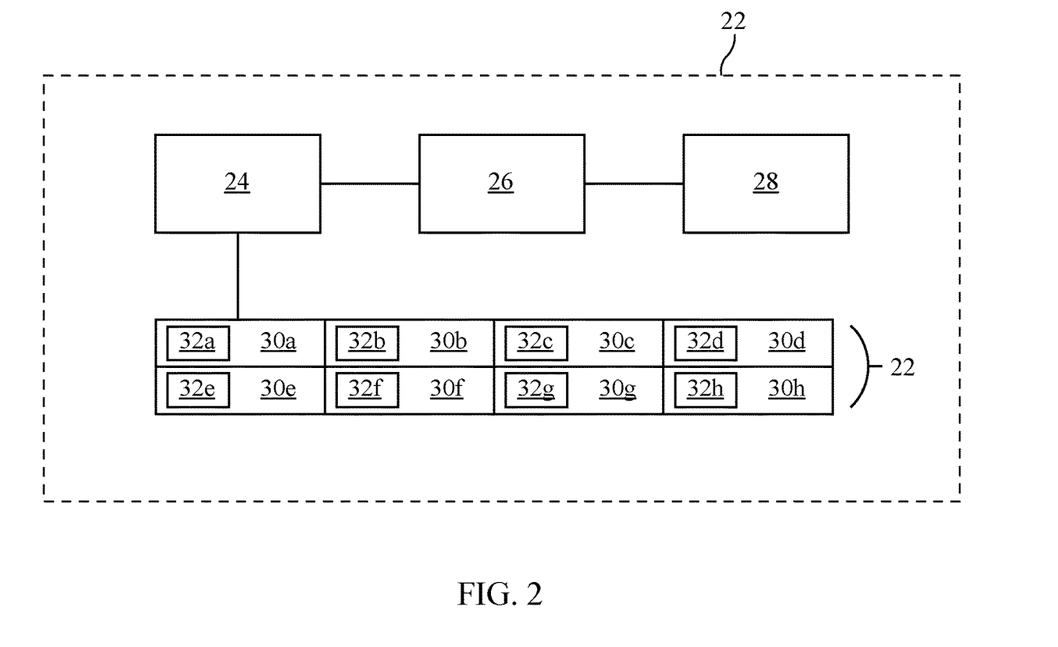
FIG. 2 is a simplified block diagram of an exemplary drive system for the electrified machine of FIG. 1, including a battery array, according to an aspect of the present disclosure.

FIG. 2 is a simplified block diagram of an exemplary drive system 20 for the electrified machine 10 of FIG. 1, including a battery array 22, according to an aspect of the present disclosure. The drive system 20 may generally include the battery array 22, configured to store electricity, a controller 24, also referred to herein as a battery controller, for controlling the distribution of power from the battery array 22, and one or more motors 26 ultimately driving the ground-engaging elements 18 of FIG. 1 using electricity from the battery array 22. The drive system 20 may include additional and/or alternative components, including, for example, a transmission 28, as is known to those skilled in the art.

The battery array 22 may include a plurality of individual battery cells, or groups of battery cells, 30a, 30b, 30c, 30d, 30e, 30f, 30g, and 30h joined together. For example, a plurality of rechargeable lithium-ion batteries, or groups of rechargeable lithium ion batteries, may be joined together, or connected, in a serial fashion to form the battery array 22. To be clear, each depicted cell, such as cell 30a, may represent an individual battery cell or a group of battery cells. It should be appreciated, however, that a variety of battery types and/or storage arrangements may be used to provide electrical power for the drive system 20 and/or additional systems or components of the electrified machine 10.

According to the exemplary embodiment of the present disclosure, a plurality of cell monitors 32a, 32b, 32c, 32d, 32e, 32f, 32g, and 32h may be in communication with the individual battery cells, or groups of battery cells, 30a-30h. According to some embodiments, each of the plurality of cell monitors 32a-32h may communicate with exactly one of the individual battery cells, or groups of battery cells, 30a-30h. The plurality of cell monitors 32a-32h may be configured to measure voltage, charge and discharge current, consumed amps, and/or remaining cell capacity for respective individual battery cells, or groups of battery cells, 30a-30h. Although eight individual battery cells, or groups of battery cells, 30a-30h and eight corresponding cell monitors 32a-32h are shown, it should be appreciated that any number of individual battery cells, or groups of battery cells, 30a-30h and cell monitors 32a-32h may be used.

Figure 3:
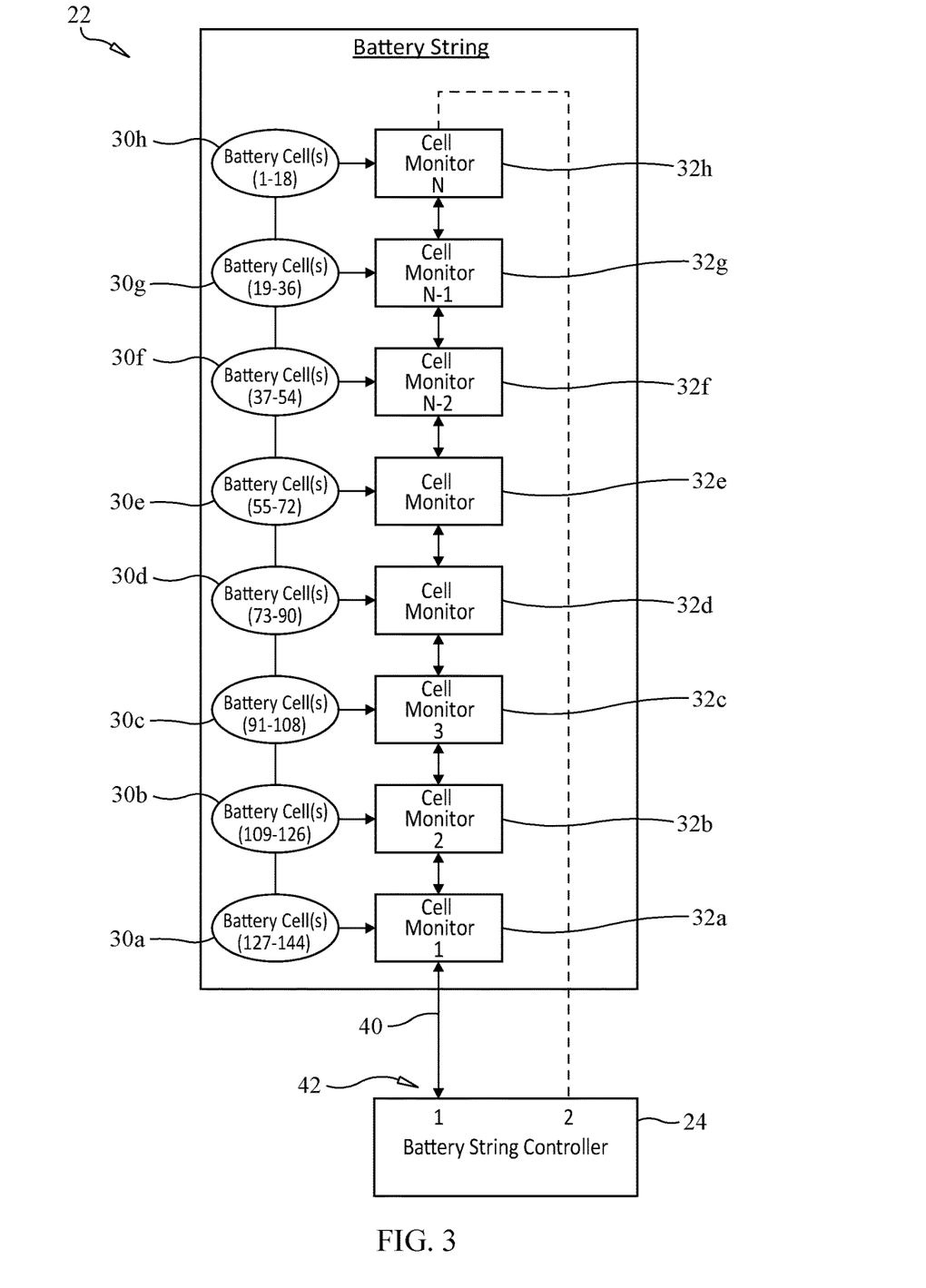
FIG. 3 is a simplified block diagram of individual battery cells, or groups of battery cells, of the exemplary battery array of FIG. 2 and corresponding cell monitors, depicting a first communication pattern, according to another aspect of the present disclosure.

The plurality of cell monitors 32a-32h may pass information about the individual battery cells, or groups of battery cells, 30a-30h they monitor to the battery controller 24, or another controller. As shown in FIG. 3, the plurality of cell monitors 32a-32h may monitor and, thus, receive information from, and/or generate information for, a corresponding one of the individual battery cells, or groups of battery cells, 30a-30h. According to the present disclosure, the battery controller 24 may request, or the individual battery cells, or groups of battery cells, 30a-30h and/or cell monitors 32a-32h may automatically send predetermined information, including health, charge, status, and the like pertaining to the individual battery cells, or groups of battery cells, 30a-30h and/or the plurality of cell monitors 32a-32h. According to the exemplary embodiment, the information regarding the individual battery cells, or groups of battery cells, 30a-30h may traverse the plurality of cell monitors 32a-32h in a first pattern to the battery controller 24.

For example, the information may traverse the plurality of cell monitors 32a-32h in series. In particular, for example, the information may follow a serial communication path 40 through the plurality of cell monitors 32a-32h in a first starting direction, using a first port 42 of the battery controller 24. According to the exemplary embodiment, information requests regarding the individual battery cells, or groups of battery cells, 30a-30h may pass in series from cell monitor 32a to cell monitor 32h, with information regarding the individual battery cells, or groups of battery cells, 30a-30h being passed to the battery controller 24 from cell monitor 32h to cell monitor 32a. This operation may persist continuously or intermittently for a period of time or until occurrence of a predetermined event, such as occurrence of a predetermined state of one or more of the individual battery cells, or groups of battery cells, 30a-30h and/or the plurality of cell monitors 32a-32h. According to a specific embodiment, information may be requested and sent one or more times a second.

After a predetermined period of time or occurrence of a predetermined event, the information may traverse the plurality of cell monitors 32a-32h in a second pattern that is different than the first pattern to the battery controller 24. In particular, and with reference to FIG. 4, the information may follow a serial communication path 50 through cell monitors 32h-32a in a second starting direction, opposite the first starting direction, using a second port 52 of the battery controller 24. According to the exemplary embodiment, information requests regarding the individual battery cells, or groups of battery cells, 30h-30a may pass in series from cell monitor 32h to cell monitor 32a, with information regarding the individual battery cells, or groups of battery cells, 30a-30h being passed to the battery controller 24 from cell monitor 32a to cell monitor 32h.

Figure 4:
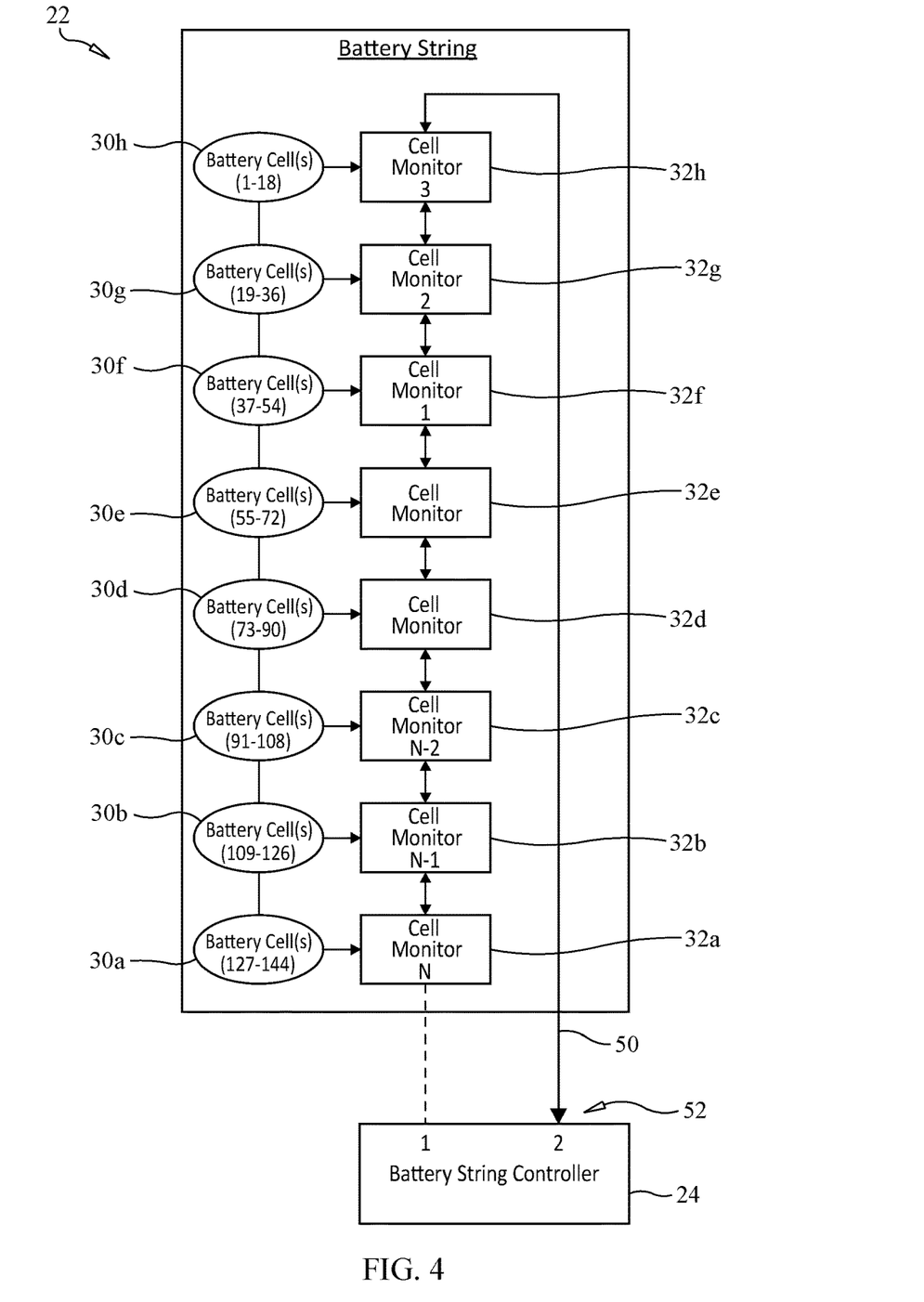
FIG. 4 is a simplified block diagram of individual battery cells, or groups of battery cells, and corresponding to cell monitors, depicting a second communication pattern, according to another aspect of the present disclosure.

The battery controller 24, or other controller, may switch between the first pattern (such as, for example, along the serial communication path 40 in the first starting direction) and the second pattern (such as, for example, along the serial communication path 50 in the second starting direction) at a predetermined frequency or upon detection of a predetermined event or state. For example, using a predetermined time period to invoke switching may assist in ensuring the load caused by cell monitoring stays balanced. Additionally and/or alternatively, switching between patterns may be useful when it is detected that cell characteristics or loading has caused some of the individual battery cells, or groups of battery cells, 32a-32h to be loaded more than others. Upon detection, switching between the first and second patterns may be used to apply the most cell monitoring load to a side of the string of battery cells 32a-32h having the highest state of charge.

INDUSTRIAL APPLICABILITY

The present disclosure relates generally to a system and method for balancing battery cell charge in a large battery array. Further, the present disclosure is applicable to balancing battery cell charge in a battery array configured to drive an electrified machine. More particularly, the present disclosure is directed to a system and method for balancing battery cell charge in electrified machine or vehicle applications to reduce charge imbalance, which may result in increased machine downtime while the battery array is balanced and recharged.

Referring to FIGS. 1-4, an electrified machine 10 may include a machine frame 12 supporting at least an operator control station 14 and a dump body 16. Ground-engaging elements 18, such as wheels and/or tires, may also be supported by the machine frame 12, and may be powered by a drive system 20, supported by the machine frame 12. The drive system 20 may generally include a battery array 22, configured to store electricity, a battery controller 24 for controlling the distribution of power from the battery array 22, and one or more motors 26 ultimately driving the ground-engaging elements 18 of FIG. 1 using electricity from the battery array 22. The drive system 20 may include additional and/or alternative components, including, for example, a transmission 28, as is known to those skilled in the art.

The battery array 22 may include a plurality of individual battery cells, or groups of battery cells, 30a, 30b, 30c, 30d, 30e, 30f, 30g, and 30h joined together. A plurality of cell monitors 32a, 32b, 32c, 32d, 32e, 32f, 32g, and 32h may be in communication with, and powered by, the individual battery cells, or groups of battery cells, 30a-30h. The plurality of cell monitors 32a-32h may be configured to measure voltage, charge and discharge current, consumed amps, and/or remaining cell capacity for respective individual battery cells, or groups of battery cells, 30a-30h. The plurality of cell monitors 32a-32h may pass information about the individual battery cells, or groups of battery cells, 30a-30h they monitor to the battery controller 24, or another controller.

The plurality of cell monitors 32a-32h, during operation, consume energy from the individual battery cells, or groups of battery cells, 30a-30h, which are intended to provide energy for primary machine functions. In addition, the nature of operation and inter-module communications architecture of the plurality of cell monitors 32a-32h may lead to energy imbalance of the individual battery cells, or groups of battery cells, 30a-30h.

For example, each of the plurality of cell monitors 32a-32h that is positioned between the battery controller 24 and another one of the cell monitors 32a-32h that is communicating information needs to be "awake" (e.g., "powered on" rather than "powered off"), thus consuming energy from the corresponding one of the individual battery cells, or groups of battery cells, 30a-30h being monitored. Put another way, information requests may be transmitted from the battery controller 24 in series from cell monitor 32a to cell monitor 32h, while the requested information may be transmitted, or returned, to the battery controller 24 from cell monitor 32h to cell monitor 32a. As a result, cell monitor 32a may utilize more energy than cell monitor 32h.

If cell monitor usage is not managed well, some individual battery cells, or groups of battery cells, 30a-30h may deplete more than others, causing charge imbalance. This charge imbalance can result in increased machine downtime while the battery array 22 is balanced and recharged. In particular, for example, when the one of the individual battery cells, or groups of battery cells, 30a-30h having the least amount of energy is depleted to a particular discharge limit, the machine function may cease until a recharge occurs.

Figure 5:
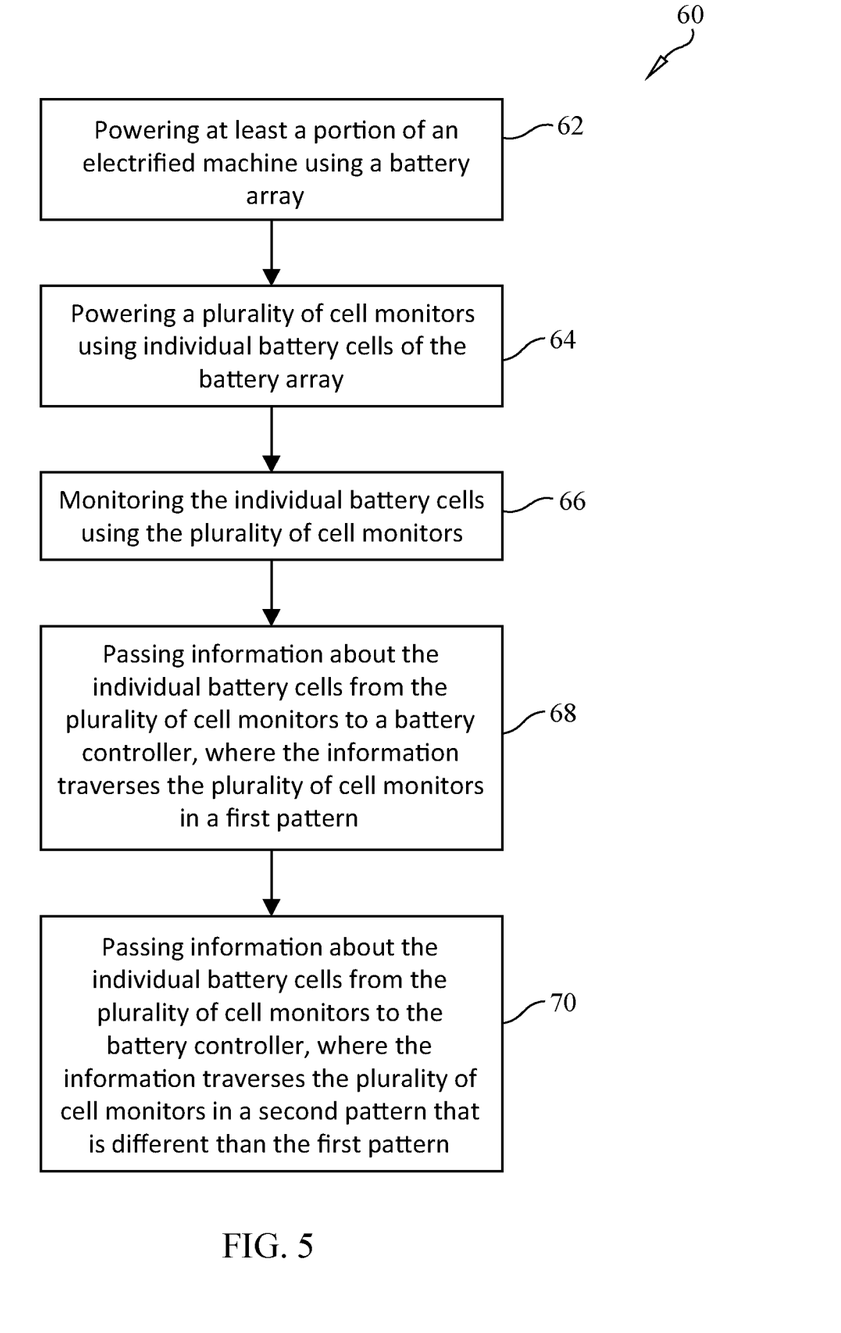
FIG. 5 is a flow diagram representing an exemplary method of balancing battery cell charge in the battery array, according to another aspect of the present disclosure.

The system and method of the present disclosure may reduce the occurrence of charge imbalance. Referring additionally to FIG. 5, a flow diagram representing a method for balancing battery cell charge using the system disclosed herein is shown generally at 60. The method may be carried out by the battery controller 24, and may run continuously or intermittently. The battery controller 24 may include a processor, such as, for example, a central processing unit, a memory, and an input/output circuit that facilitates communication internal and external to the battery controller 24. The processor, for example, may control operation of the battery controller 46 by executing operating instructions, such as, for example, computer readable program code stored in a memory, wherein operations may be initiated internally or externally to the battery controller 46.

The method includes powering at least a portion of the electrified machine 10 using the battery array 22 (at box 62). The method may also include powering a plurality of cell monitors 32a-32h using individual battery cells, or groups of battery cells, 30a-30h of the battery array 22 (at box 64), and monitoring the individual battery cells, or groups of battery cells, 30a-30h using the plurality of cell monitors 32a-32h (at box 66). The monitoring step may include monitoring each of the plurality of cell monitors 32a-32h with exactly one of the individual battery cells, or groups of battery cells, 30a-30h.

Information about the individual battery cells, or groups of battery cells, 30a-30h may be passed from the plurality of cell monitors 32a-32h to the battery controller 24, with the information traversing the plurality of cell monitors 32a-32h in a first pattern. For example, the information may traverse the plurality of cell monitors 32a-32h in series. That is, the information may follow a serial communication path 40 through the plurality of cell monitors 32a-32h in a first starting direction.

Thereafter, information about the individual battery cells, or groups of battery cells, 30a-30h may be passed from the plurality of cell monitors 32a-32h to the battery controller 24, with the information traversing the plurality of cell monitors 32a-32h in a second pattern that is different than the first pattern. For example, after the information follows the serial communication path 40 in the first starting direction, the information may follow serial communication path 50 in a second starting direction that is different than, or opposite, the first starting direction. According to a specific embodiment, the battery controller 24 may switch between the first starting direction and the second starting direction (or the first pattern and the second pattern) at a predetermined frequency.

The present disclosure provides a means for balancing battery cell power, by switching the order of information transmission to alternate which of the individual battery cells, or groups of battery cells, 30a-30h experience more load over time, thus reducing the occurrence of imbalance of the battery cells, or groups of battery cells, 30a-30h of the battery array 22. This charge imbalance can result in increased machine downtime while the battery array 22 is balanced and recharged. It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A system for balancing battery cell charge in a battery array for an electrified machine, including:
   the battery array including a plurality of individual battery cells, or groups of battery cells;
   a plurality of cell monitors in communication with the individual battery cells, or groups of battery cells, wherein the plurality of cell monitors are powered by the individual battery cells, or groups of battery cells; and
   a battery controller receiving information about the individual battery cells, or groups of battery cells, from the plurality of cell monitors,
   wherein the information traverses the plurality of cell monitors in a first pattern to the battery controller and, after a predetermined period of time or occurrence of a predetermined event, the information traverses the plurality of cell monitors in a second pattern, which is different than the first pattern, to the battery controller, to balance loading on the individual battery cells or the groups of battery cells due to operation of the plurality of cell monitors during the first pattern and the second pattern of information traversals via the plurality of cell monitors.

2. The system of claim 1, wherein each of the plurality of cell monitors communicates with exactly one of the individual battery cells or exactly one group of battery cells.

3. The system of claim 1, where the information traverses the plurality of cell monitors in series.

4. The system of claim 1, wherein the information follows a serial path through the plurality of cell monitors in a first starting direction.

5. The system of claim 4, wherein, after the information follows the serial path in the first starting direction, the information follows the serial path in a second starting direction that is opposite the first starting direction.

6. The system of claim 5, wherein the battery controller switches between the first starting direction and the second starting direction at a predetermined frequency.

7. The system of claim 1, wherein the second pattern is the reverse of the first pattern.

8. A method of balancing battery cell charge in a battery array for an electrified machine, including:
powering at least a portion of the electrified machine using the battery array;
powering a plurality of cell monitors using individual battery cells, or groups of battery cells, of the battery array;
monitoring the individual battery cells, or groups of battery cells, using the plurality of cell monitors; and
balancing loading of the individual battery cells or the groups of battery cells caused by operation of the plurality of cell monitors, said balancing the loading including:
passing information about the individual battery cells, or groups of battery cells, from the plurality of cell monitors to a battery controller, wherein the information traverses the plurality of cell monitors in a first pattern, and
after the first pattern, passing information about the individual battery cells, or groups of battery cells, from the plurality of cell monitors to the battery controller, wherein the information traverses the plurality of cell monitors in a second pattern that is different than the first pattern.

9. The method of claim 8, wherein monitoring includes monitoring each of the plurality of cell monitors with exactly one of the individual battery cells or exactly one group of battery cells.

10. The method of claim 8, wherein the information traverses the plurality of cell monitors in series.

11. The method of claim 10, wherein the information follows a serial path through the plurality of cell monitors in a first starting direction.

12. The method of claim 11, wherein, after the information follows the serial path in the first starting direction, the information follows the serial path in a second starting direction that is different than the first starting direction.

13. The method of claim 12, wherein the second pattern is the reverse of the first pattern.

14. The method of claim 8, further including switching between the first pattern and the second pattern at a predetermined frequency.

15. An electrified machine, including:
a machine frame;
ground-engaging elements supported by the machine frame;
a battery array including a plurality of individual battery cells, or groups of battery cells, supported by the machine frame for powering the ground-engaging elements;
a plurality of cell monitors in communication with the individual battery cells, or groups of battery cells, wherein the plurality of cell monitors are powered by the individual battery cells, or groups of battery cells; and
a battery controller receiving information about the individual battery cells, or groups of battery cells, from the plurality of cell monitors,
wherein the information traverses the plurality of cell monitors in a first pattern to the battery controller and, after a predetermined period of time or occurrence of a predetermined event, the information traverses the plurality of cell monitors in a second pattern, which is different than the first pattern, to the battery controller, to balance charge of the individual battery cells or the groups of battery cells based on operation of the plurality of cell monitors according to the first pattern and the second pattern.

16. The electrified machine of claim 15, wherein each of the plurality of cell monitors communicates with exactly one of the individual battery cells or exactly one group of battery cells.

17. The electrified machine of claim 15, wherein the information traverses the plurality of cell monitors in series.

18. The electrified machine of claim 17, wherein the information follows a serial path through the plurality of cell monitors in a first starting direction.

19. The electrified machine of claim 18, wherein, after the information follows the serial path in the first starting direction, the information follows the serial path in a second starting direction that is different than the first starting direction.

20. The electrified machine of claim 19,
wherein a first information path for the information of the first pattern begins from the battery controller to a first cell monitor of the plurality of cell monitors and ends with the information provided to the battery controller from a second cell monitor of the plurality of cell monitors different from the first cell monitor, and
wherein a second information path for the information of the second pattern begins from the battery controller to a third cell monitor of the plurality of cell monitors and ends with the information provided to the battery controller from a fourth cell monitor of the plurality of cell monitors different from the third cell monitor.

* * * * *